United States Patent
Epstein et al.

(10) Patent No.: US 6,922,575 B1
(45) Date of Patent: Jul. 26, 2005

(54) COMMUNICATIONS SYSTEM AND METHOD UTILIZING INTEGRATED CHIP ANTENNA

(75) Inventors: Norman Epstein, St. Lucie West, FL (US); Robert Vu, Houston, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 382 days.

(21) Appl. No.: 10/079,318

(22) Filed: Feb. 20, 2002

Related U.S. Application Data
(60) Provisional application No. 60/272,686, filed on Mar. 1, 2001.

(51) Int. Cl.[7] .................................................. H04B 1/38
(52) U.S. Cl. ..................... 455/575.7; 455/129; 455/333; 343/702; 343/895
(58) Field of Search ................................ 343/702, 873, 343/895, 718; 455/575.7, 333, 129

(56) References Cited

U.S. PATENT DOCUMENTS

| | | | |
|---|---|---|---|
| 5,541,610 A | * 7/1996 | Imanishi et al. ............. 343/702 |
| 5,798,737 A | 8/1998 | Kanaba et al. ............... 343/895 |
| 5,903,239 A | * 5/1999 | Takahashi et al. ...... 343/700 MS |
| 5,909,198 A | * 6/1999 | Mandai et al. ............... 343/702 |
| 5,933,116 A | 8/1999 | Suesada et al. .............. 343/702 |
| 5,973,651 A | 10/1999 | Suesada et al. .............. 343/752 |
| 5,977,927 A | 11/1999 | Mandai et al. ............... 343/788 |
| 6,028,568 A | 2/2000 | Asakura et al. ............. 343/895 |
| 6,052,096 A | 4/2000 | Tsuru et al. .................. 343/787 |
| 6,075,491 A | 6/2000 | Dakeya et al. ............... 343/722 |
| 6,111,544 A | 8/2000 | Dakeya et al. ............... 343/700 |
| 6,239,752 B1 | 5/2001 | Blanchard ..................... 343/702 |
| 6,271,803 B1 | 8/2001 | Watanabe et al. ............ 343/895 |
| 6,288,680 B1 | * 9/2001 | Tsuru et al. .................. 343/702 |
| 6,342,858 B1 | 1/2002 | Dakeya et al. ............... 343/702 |
| 6,373,447 B1 | 4/2002 | Rostoker et al. ............. 343/895 |

* cited by examiner

Primary Examiner—Lee Nguyen
Assistant Examiner—Sanh Phu
(74) Attorney, Agent, or Firm—Amin & Turocy, LLP

(57) ABSTRACT

A portable communications system and method is provided in accordance with the present invention. The system includes a chip antenna for transmitting and receiving RF signals and a communications module case for mounting the chip antenna and providing a chip antenna ground plane. A communications subsystem is associated with the communications module case and is operatively coupled to the chip antenna for processing the RF signal.

21 Claims, 5 Drawing Sheets

COMMUNICATIONS SYSTEM AND METHOD UTILIZING INTEGRATED CHIP ANTENNA

REFERENCE TO RELATED APPLICATION

This application claims the benefit of U.S. Provisional Patent Application Ser. No. 60/272,686, which was filed Mar. 1, 2001, entitled COMMUNICATION SYSTEM AND METHOD UTILIZING INTEGRATED CHIP ANTENNA.

TECHNICAL FIELD

The present invention relates generally to Radio Frequency (RF) communications systems, and more particularly to a system and method providing a communications interface wherein an integrated chip antenna is employed to create an easily manufactured, lower cost communications system.

BACKGROUND OF THE INVENTION

Wireless communications systems have experienced rapid growth and technological innovation in recent years. Society has accepted and in some cases become dependent upon wireless technologies such as cellular phones and pagers for daily personal and professional communications. This has become possible by continual advancements in microelectronics and power technologies, which have aided in decreasing the size, weight and cost of these devices while increasing functionality. Many industrial and commercial applications have come to deposit on wireless technologies as well. Factories, warehouses, retail establishments and service establishments (e.g., rental car agencies and utilities) have also come to depend on wireless technologies thereby enabling workers to be more productive and decreasing their overall costs. Inventory control stations, checkout or billing systems, pricing and labeling systems, automatic storage and retrieval systems and short-range employee communications systems are just a few examples of applications that benefit from wireless communications technology.

Wireless communication systems utilize several well-known components such as a receiver, transmitter and an antenna. The receiver and transmitter, hereafter referred to as a communications module or subsystem, powers, filters, modulates and de-modulates associated communications signals, wherein the antenna is employed to receive and broadcast these signals. Antennas may be manufactured from many conductive materials, and are constructed according to the frequency of signal that is being received and/or broadcast. For example, a communications device that is receiving or broadcasting in the 400 megahertz frequency range will need a longer antenna than a comparable communications device receiving or broadcasting in the 900 megahertz frequency range due to the wavelength of the signal. There are many methods for constructing antennas and attaching them to communications modules in practice today. Many manufacturer install an externally mounted flexible rod, or whip antenna on their communications systems. These may be hard-wired into the communications module, or they may be detachable through techniques such as a threaded base. Devices that do not require long-range communications may have an internally mounted antenna such as a length of wire or coaxial cable. These and other methods of antenna construction and installation within a communications module are widely practiced and accepted, but each has drawbacks that render these techniques less than optimal.

Externally mounted antennas extend into the atmosphere from the communications device on which it is installed. The result is often less than aesthetically pleasing and has functional ramifications as well. Because of the protrusion of the antenna from the main body of the product; it is easy to catch or "snag" the device on stationary objects. If the communications device is dropped or placed without care, the antenna is likely to be affected due to its exposed installation. Impacts such as this will, over time, have the affect of distorting or damaging the antenna, thus changing the operating parameters. This could include a decrease in effective range, changing the desired operating signal frequency, and intermittent operation. The externally mounted antenna also creates challenges in manufacturing, as the method used to mount this type of antenna generally requires more parts and more machining processes, both of which will add labor, complexity and cost to the system.

Internally mounted wire of coaxial cable antenna, hereinafter referred to as a cable antenna, mitigates some of the problems associated with the exposed installation of an external antenna, but creates other obstacles in the process. Depending on the operating frequency, the cable required could be many inches in length, which may cause difficulty in securely placing and fastening the cable antenna within the communications devices. Because of the highly flexible nature of cable antennas, it is difficult to uniformly place and fasten them in each communication device manufactured, thus operating differences from one communications device to another are common. Also, sudden movement of the communications device or impact with another object may displace the cable antenna from the desired mounted position, thus dramatically affecting the performance of the device. The manufacture of the cable antenna is generally a manual process, and thus control of the final operating parameters is less than optimal.

In view of the above problems associated with externally and/or internally mounted wire antennas, there is an unsolved need for a system and methodology to provide reliable, higher quality and lower cost communications devices to consumers.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method providing a lower cost and higher reliability communications system utilizing an integrated chip antenna. The system employs chip antenna technology which may be electrically coupled to a small printed circuit card or flexible circuit material, hereafter referred to as the circuit material, and a packaged radio or communications subsystem/module that is available in various configuration through numerous manufacturers. The present invention integrates the chip antenna technology within a packaged communications module creating a reliable, and lower cost communications system. The communications system may include a receiver and/or transmitter, and may operate in suitable frequency ranges as provided by the chip antenna.

In accordance with the present invention, the chip antenna is operatively coupled to the circuit material. Chip antennas are generally small in size, and can be mounted to the circuit material through a surface mounting solder process. This process creates a substantially rigid, non-flexible connection to the circuit material. The circuit material is then mechanically adhered to the electrically isolated from the surface of the conductive case of a communications module. The case of the communications module may be fabricated of and/or coated with conductive materials that are readily available. The circuit material is etched to allow for electrical coupling of the chip antenna to circuitry within the communications module. The case of the communications module provides an electrically isolated access through the conductive surface of the case to communications circuitry contained therein. Electrical coupling of the chip antenna circuit to the communication circuitry may be achieved through mating connectors or direct connection of a flexible circuit material into the communication module circuit, as well as other techniques when employed in accordance with the present invention.

In accordance with one aspect of the present invention, a portable communications system is provided. The system includes a chip antenna for transmitting and receiving RF signals, and a communications module case for mounting the chip antenna and providing a chip antenna ground plane. A communications subsystem that is associated with the communications module case is operatively coupled to the chip antenna for processing the RF signals.

According to another aspect of the present invention, a method is provided for portable communications. The method includes: utilizing a chip antenna for transmitting and receiving RF signals; attaching the chip antenna to a communications module case to provide a chip antenna ground plane; and coupling the chip antenna to a communication subsystem that is associated with the communications module case for processing the RF signals.

According to yet another aspect of the present invention, a portable communications system is provided. The system includes a chip antenna for transmitting and receiving RF signals; means for mounting the chip antenna to a communications module case to provide a chip antenna ground plane, and means for coupling the chip antenna to a communications subsystem that is associated with the communications module case for processing the RF signals.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides and methodology for creating a compact, reliable, low cost communications system through integration of a communications module and a chip antenna. The chip antenna is protected from external elements, and is coupled to the case of the communications module. This prevents movement of the relative position of the antenna in relation to the communications module, facilitates consistent performance from one communications module to another, and decreases the probability of performance degradation due to sudden movements of or mechanical shock to the communications module.

Figure 1:
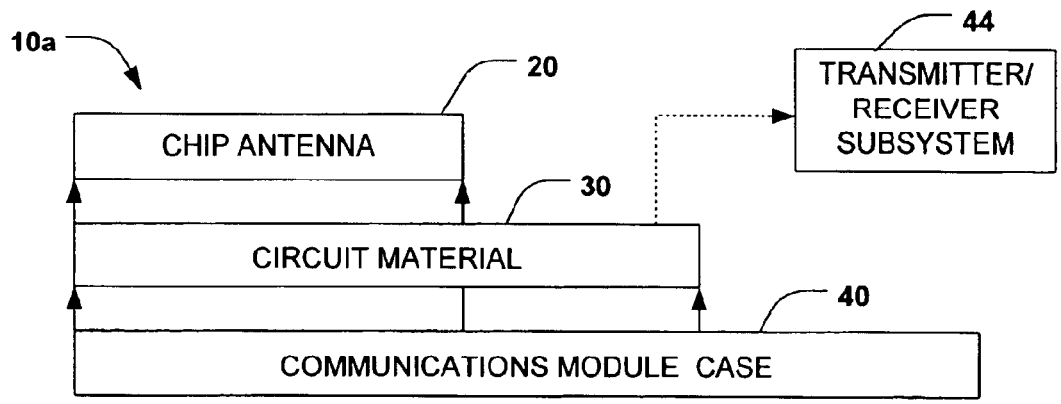
FIG. 1 is a schematic block diagram illustrating a communications system with an integrated antenna in accordance with an aspect of the present invention.
Figure 1:
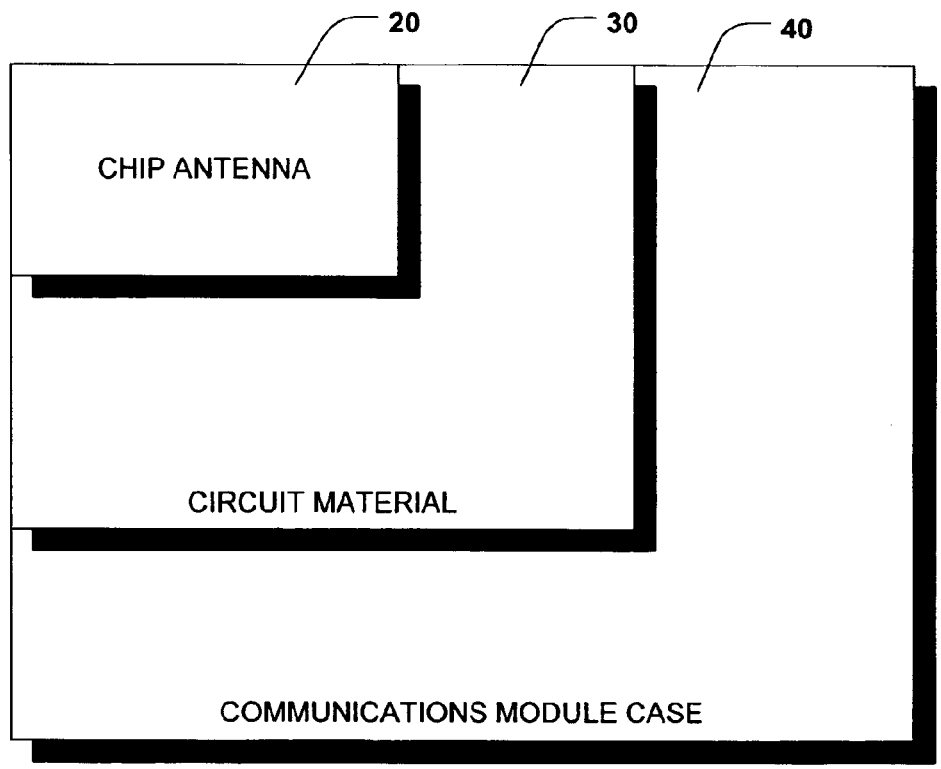

Referring initially to FIG. 1, a hand-held or portable communications system 10a is depicted which includes a chip antenna 20, circuit material 30, a communications module case 40 and a communications subsystem such as a transmitter and/or receiver subsystem 44 (e.g., wireless transceiver). FIG. 1 illustrates a side view and a top view of respective antenna, circuit material, and module case configuration in accordance with the present invention. Referring to the side view of the communications system 10a, the chip antenna 20 is operatively coupled to the circuit material 30 that is affixed to the exterior of the communications module case 40. The circuit material 30 provides an operative connection to the communications module case 40 wherein the case provides a ground connection and/or plane for the chip antenna 20. A signal connection 46 operatively couples a received or transmitted RF signal (not shown) from the chip antenna 20 to the transmitter/receiver subsystem 44.

The transmitter/receiver subsystem 44 can be substantially any well-known communications interface for transmitting and/or receiving RF signals and providing subsequent RF signal processing. These interfaces may include cell-phones, pagers, Personal Digital Assistants (PDA), scanner (e.g., bar code) and hand-held or portable computers such as Palm Pilots. By utilizing the chip antenna 20 in accordance with the present invention, problems associated with mounting and construction of exterior/interior wire antennas in conjunction with portable communications devices are mitigated. Moreover, the chip antenna 20 generally provides for lower costs and higher reliability operation than with conventional wire antenna systems.

Referring now to the top view of the communications system 10a in FIG. 1, it can be observed that the chip antenna 20 is mounted upon the circuit material 30. The chip antenna 20 and circuit material 30 are then mounted upon the communications module case 40 to complete the signal transmitting/receiving portions of the communications system 10a. It is noted that the size relationship of chip antenna 20 and circuit material 30 to the communications module case 40 is not to scale in FIG. 1. It is understood that the size relationship is dependent upon the desired frequency range of the chip antenna 20. For example, the communications module case 40 may be substantially any size, but generally not smaller than is required to create a ground plate for the chip antenna 20. For example, when coupled to chip antennas that operate in the four hundred (400) megahertz to twenty-four hundred (2400) megahertz range, the ground plane will be about ten (10) to thirty (30) times the size of the chip antenna. It is also noted that the relative placement of chip antenna 20 and circuit material 30 in reference to communications module case 40 is for clarity of illustration. It is to be appreciated that the chip antenna 20 may be placed at any suitable location on circuit material 30, and that circuit material 30 may be placed at any suitable location on communications module case 40.

Figure 2:
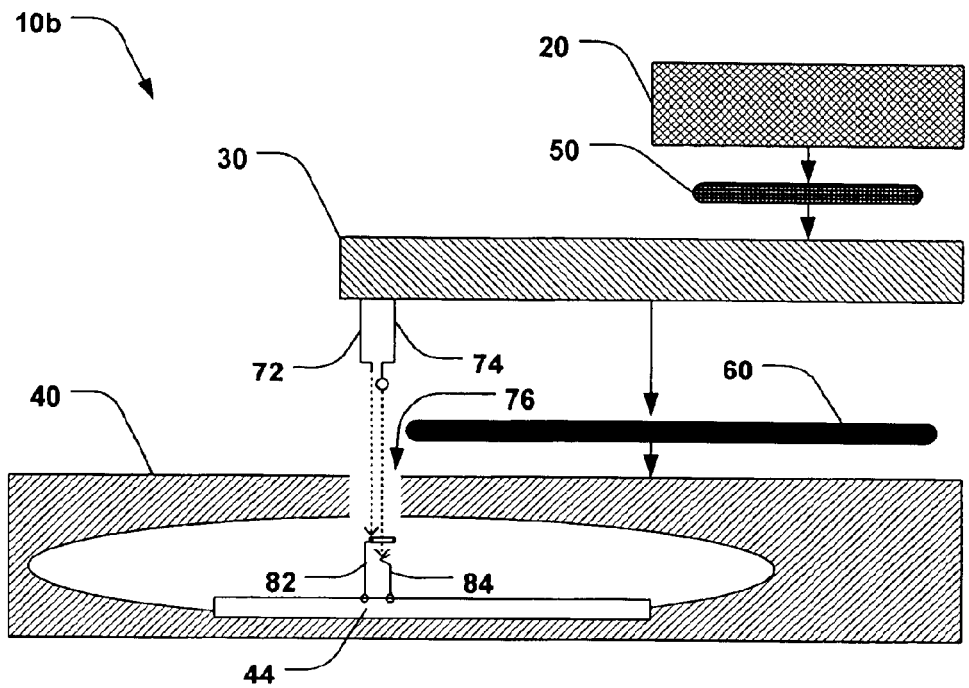
FIG. 2 is a schematic block diagram illustrating a communications system with an integrated antenna and an adhesive mounted circuit material in accordance with an aspect of the present invention.

Turning now to FIG. 2, a communications system 10b illustrates an aspect of an exemplary chip antenna configuration in accordance with the present invention. The chip antenna 20 is electrically coupled to circuit material 30 via solder connection 50. According to this aspect of the invention, the circuit material 30 is in the form of rigid printed circuit card, and is coupled to the communications module case 40 via a non-conductive adhesive 60. The circuit material 30 is coupled to the transmitter/receiver subsystem 44 via mating connectors 72 and 74 through an opening 76 in module case 40. The opening 76 may be placed in any location on the module case 40 that will facilitate the coupling of circuit material 30 and the transmitter/receiver subsystem 44. The transmitter/receiver subsystem 44 includes mating connections 82 and 84 respectively for coupling to connectors 72 and 74, wherein mating connector 82 provides a ground connection to the module case 40 and mating connecting 84 provides an RF signal connection from the chip antenna 20 to the transmitter/receiver subsystem 44. The connectors 72, 74, 82 and 84 may be commercially available connectors, custom designed connectors and/or provided by coupling wires to both the circuit material 30 and the transmitter/receiver circuit 44. It is noted that the circuit material 30 is etched and/or fabricated such that there is an electrical coupling between chip antenna 20 and mating connection 74.

Figure 3:
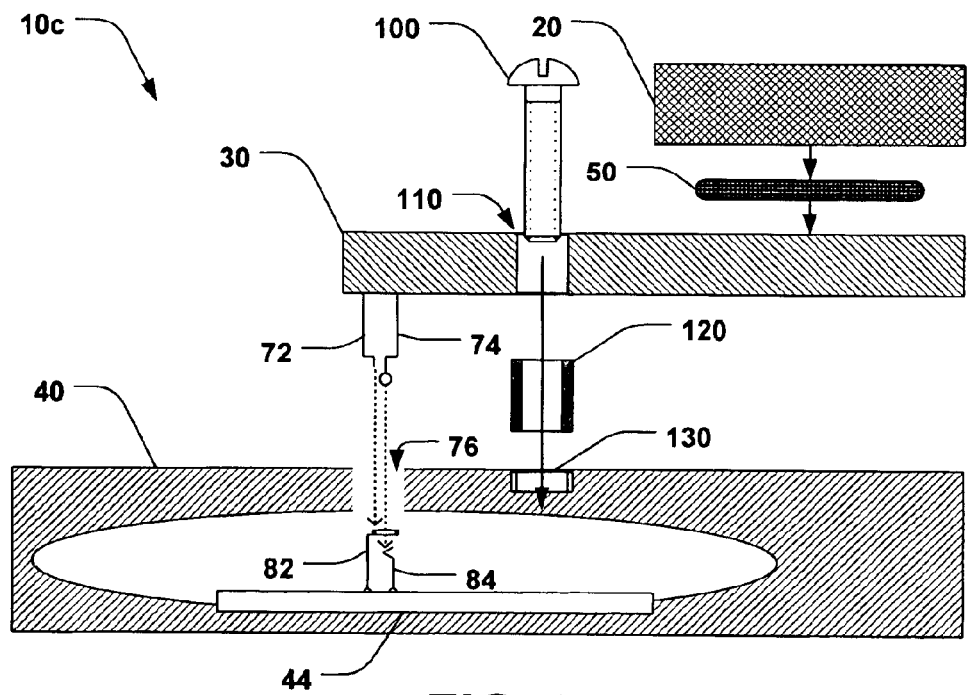
FIG. 3 is a schematic block diagram illustrating a communications system with an integrated antenna and a mechanically mounted circuit material in accordance with an aspect of the present invention.

Referring now to FIG. 3, a communications system 10c illustrates an alternative chip antenna and circuit material configuration in accordance with the present invention. The communications system 10c is similar to communications system 10b described above with the exception of coupling the circuit material 30 to the communications module case 40. According to this aspect of the invention, the circuit material 30 is coupled to the module case 40 via fastener 100. The fastener 100 passes through an opening 110 in the circuit material 30, and then through a separating element 120 into a retaining element 130. The fastener 100 may be a threaded screw, a rivet, and/or substantially any other type of fastener that will couple the circuit material 30 to the communications module case 40 in a manner that mitigates movement of the circuit material 30 relative to the case. The separating element 120 may be a standoff or washer, or other type of non-conductive material that provides for mechanical separation and electrical insulation of the circuit material 30 from the communications module case 40. The retaining element 130 may be an insert, washer or other type of retainer which when mated to the fastener 110 creates a substantially strong or rigid connection. It is to be appreciated that one or more of fasteners 110, separating element 120, and retaining elements 130 may be provided for connecting the circuit material 30 and the communications module case 40.

Figure 4:
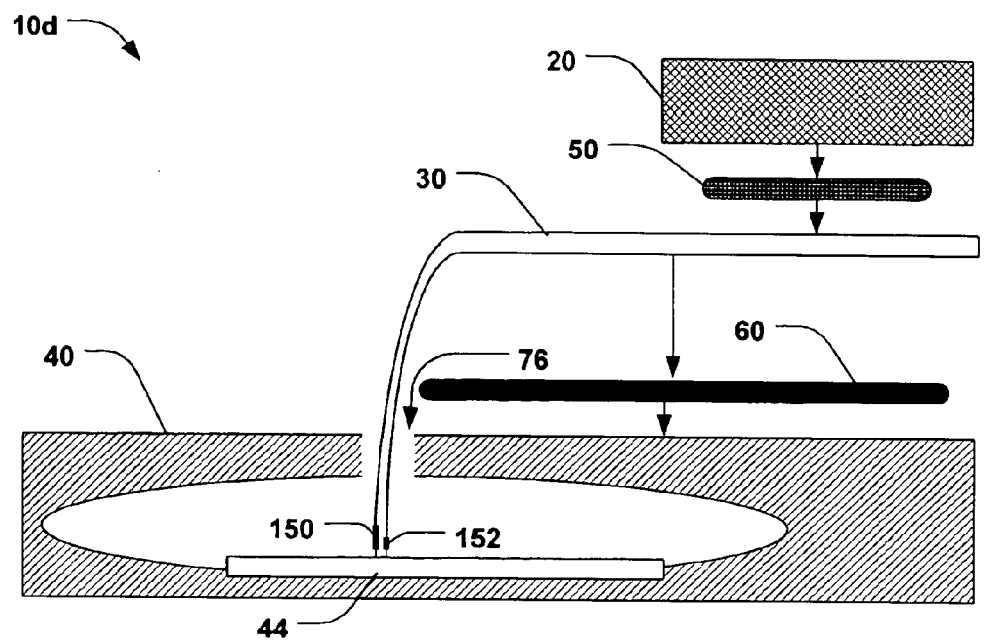
FIG. 4 is a schematic block diagram illustrating a communications system with an integrated antenna and an adhesive mounted flex circuit material in accordance with an aspect of the present invention.
Figure 5:
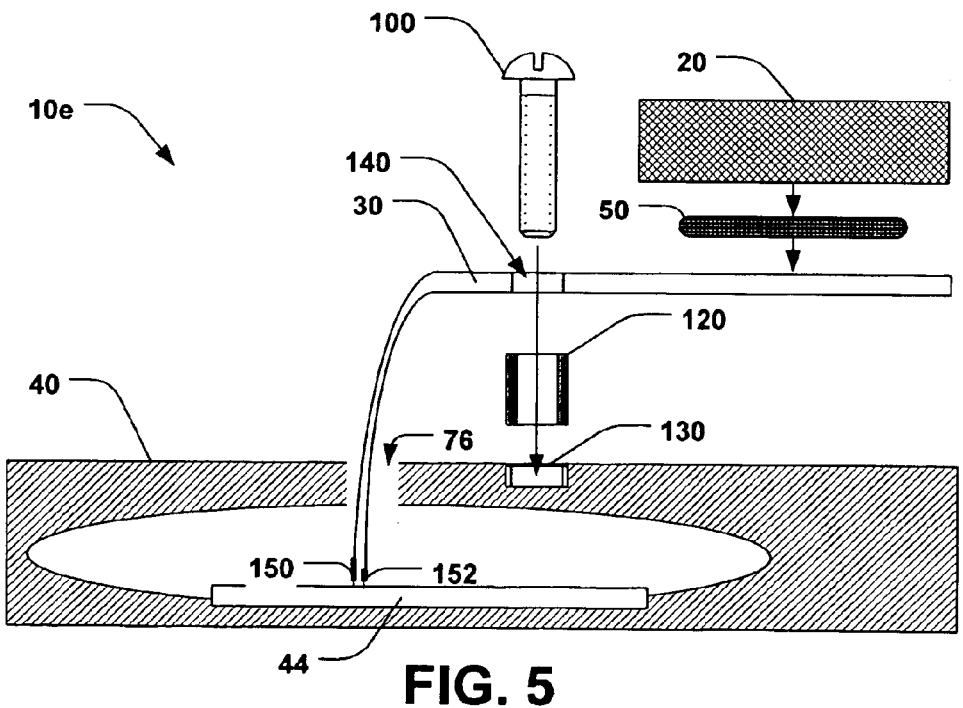
FIG. 5 is a schematic block diagram illustrating a communications system with an integrated antenna and a mechanically mounted flex circuit material in accordance with an aspect of the present invention.

Referring now to FIGS. 4 and 5, a system 10d and 10e illustrates an alternative circuit material, coupling and configuration in accordance with the present invention. The chip antenna 20 is electrically coupled to circuit material 30 via solder connection 50, as described above. According to this aspect of the invention, the circuit material 30 is in the form of a flexible circuit strip or material, and is coupled to the communications module case 40 via a non-conductive adhesive 60. The circuit material 30 is electrically coupled to the transmitter/receiver subsystem 44 via flexible connections 150 and 152 that are provided as part of the flexible circuit material 30. As described above, the circuit material 30 is etched or fabricated such that there is an electrical coupling between chip antenna 20 connections 150 and 152. Referring to FIG. 5, the communications system 10e is similar to communications system 10d with the exception of the coupling of the circuit material 30 to communications module case 40. According to this aspect of the invention, the circuit material 30 is mechanically coupled to the communications module case 40 via fastener 100, separating element 120, and retaining element 130 as described above.

Figure 6:
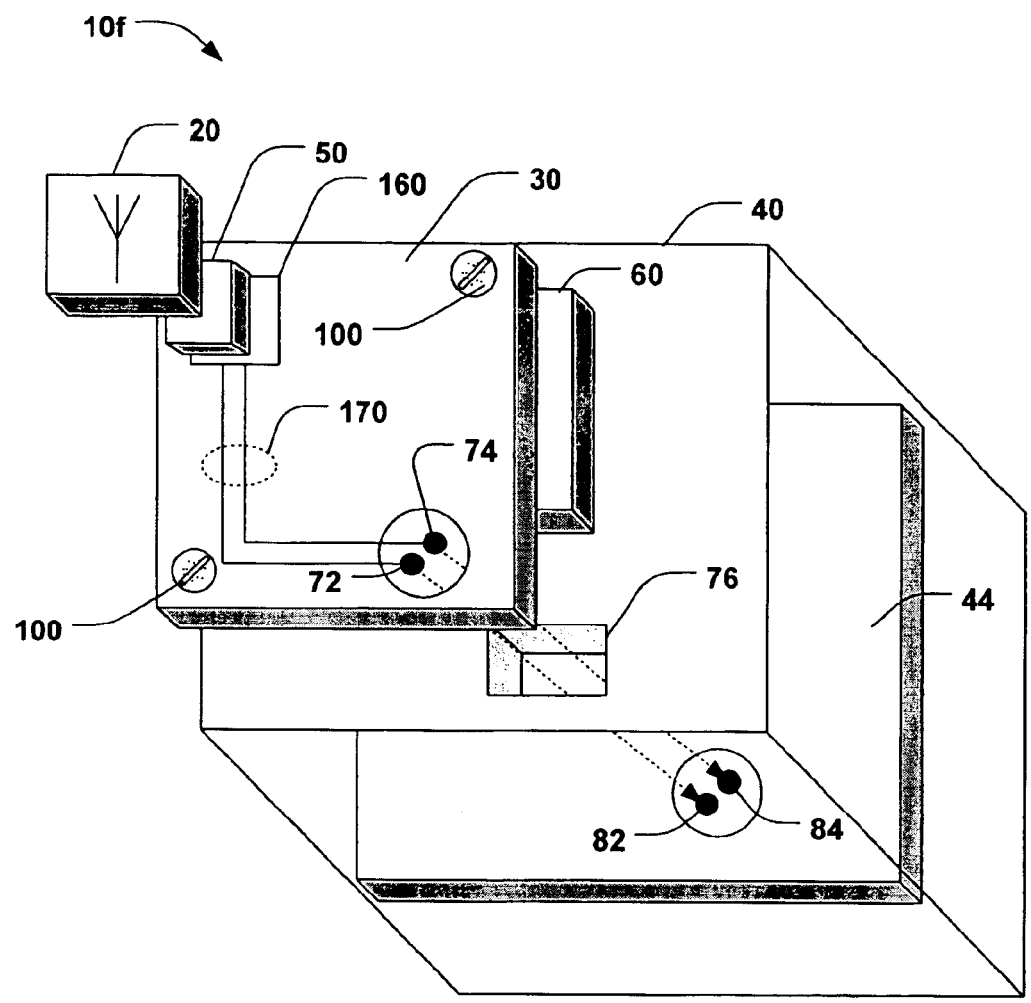
FIG. 6 is a schematic block diagram illustrating a multi dimensional view of a communications system with an integrated antenna in accordance with an aspect of the present invention.

Referring to FIG. 6, a system 10f illustrates a multi-dimensional view of a chip antenna mounting and associated structure in accordance with the present invention. The chip antenna 20 is mounted to a circuit material plane 160 via the solder 50. As depicted on the circuit material 30, a set of circuit traces 170 connect the circuit material plane 160 to the associated connector 72 and 74. As described above, the connectors 72 and 74 mate with associated connectors 82 and 84 respectively at the transmitter/receiver subsystem 44. It is noted that both adhesive material 60 and fasteners 100 are depicted for illustrative purposes for coupling the circuit material 30. It is to be appreciated with either fasteners 100, adhesive material 60 singularly or in combination may be employed to couple the circuit material 30 to the communications module case 40.

Figure 7:
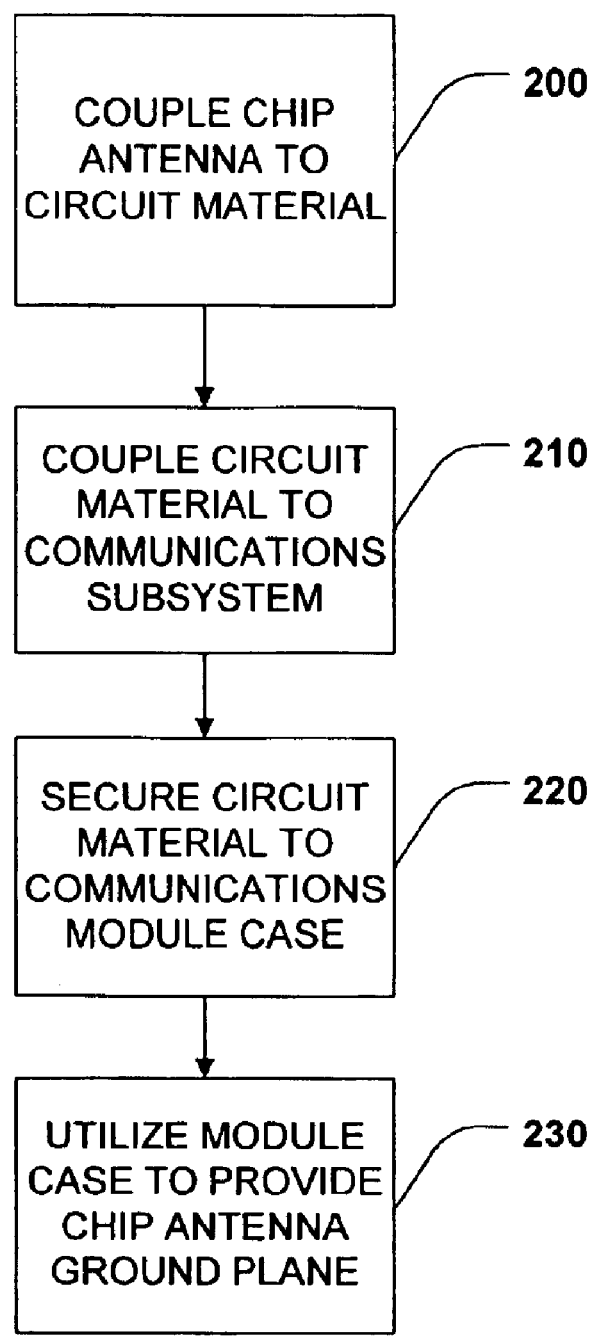
FIG. 7 is a flow diagram illustrating a methodology providing integrated chip antenna communications in accordance with the present invention.

FIG. 7 illustrates a methodology for providing integrated communications in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 7, a block diagram methodology is provided with carrying out the present invention. At 200, a chip antenna is both secured and operatively coupled to a portion of circuit material. At 210, the circuit material is operatively coupled to a communications subsystem such as a transceiver/receiver processing circuit. As described above, coupling may be provided by mating connectors associated with the circuit material and communications subsystem. Alternatively, a flex circuit material may be employed to provide coupling from the circuit material to the communications subsystem. At 220, the circuit material is secured to the communications circuit housing. This may be accomplished through various processes, including but not limited to mechanical fasteners and adhesives, in accordance with the present invention. At 230, the communications module case is employed to provide a suitable ground plane for the chip antenna.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A portable communications system, comprising:

a chip antenna that transmits and receives RF signals;

a communications module case that mounts the chip antenna and provides a chip antenna ground plane, the communications module case having a cavity that houses a connector; and a communications subsystem that associates with the communications module case and communicates to the chip antenna via the connector to process the RF signals.

2. The system of claim 1, further comprising circuit material that couples the chip antenna to the communications subsystem.

3. The system of claim 2, wherein the circuit material is at least one of a printed circuit board and a flexible circuit material.

4. The system of claim 2, wherein the circuit material is adhesively coupled to the communications module case.

5. The system of claim 2, wherein the circuit material is mechanically coupled the communications module case.

6. The system of claim 2, wherein the connectors are utilized to couple the circuit material to the communications subsystem.

7. The system of claim 3, wherein the flexible circuit material is utilized to couple the chip antenna to the communications subsystem.

8. The system of claim 1, wherein the communications module case is at least one of electrically conductive and electrically conductive via a conductive coating applied to the case.

9. The system of claim 1, wherein the communications subsystem includes at least one of an RF transmitter and receiver.

10. The system of claim 9, wherein the communications subsystem is at least one of a cell-phone, pager, Personal Digital Assistant (PDA) scanner, hand-held computer, and portable computer.

11. A method providing portable communications, comprising:

utilizing a chip antenna that interfaces with RF signals;

attaching the chip antenna to a case that creates a ground plane; and coupling the chip antenna to a communications subsystem that associated with the case to process the RF signals, the chip antenna couples to the communications subsystem via a connection within a cavity of the case.

12. The method of claim 11, further comprising, utilizing circuit material to couples the chip antenna to the communications subsystem.

13. The method of claim 12, wherein the circuit material is at least one of a printed circuit board and a flexible circuit material.

14. The method of claim 12, wherein the circuit material is adhesively coupled to the communications module case.

15. The method of claim 12, wherein the circuit material is mechanically coupled to the communications module case.

16. The method of claim 12, wherein connectors are utilized to couple the circuit material to the communications subsystems.

17. The method of claim 13, wherein the flexible circuit material is utilized to couple the chip antenna to the communications subsystem.

18. The method of claim 11, wherein the communications module case is at least one of electrically conductive and electrically conductive via a conductive coating applied to the case.

19. The method of claim 11, wherein the communications subsystem includes at least one of an RF transmitter and receiver.

20. A portable communications system, comprising:

a chip antenna that transmits and receives RF signals;

means for mounting the chip antennas to a communications module case that provides a chip antenna a ground plane, the communications module case having a cavity; and means for coupling the chip antenna to a communications subsystem that is associated with the communicates module case that processes the RF signals, the means for coupling is within the cavity.

21. A portable communications system, comprising:

a chip antenna that at least one of transmits and receives an RF signal;

a transceiver operatively coupled to the chip antenna that processes the RF signal; and a transceiver case providing a chip antenna ground plane that enables the RF signal processing and encloses a connection in a cavity that links the transceiver to the chip antenna.

* * * * *